(12) United States Patent
Guo et al.

(10) Patent No.: US 8,345,775 B2
(45) Date of Patent: Jan. 1, 2013

(54) SYSTEM AND METHOD FOR MASKING VISUAL COMPRESSION ARTIFACTS IN DECODED VIDEO STREAMS

(75) Inventors: Haitao Guo, San Jose, CA (US); Sally Fung, Sunnyvale, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1193 days.

(21) Appl. No.: 12/102,714

(22) Filed: Apr. 14, 2008

(65) Prior Publication Data
US 2009/0257507 A1    Oct. 15, 2009

(51) Int. Cl.
*H04N 7/12* (2006.01)
(52) U.S. Cl. .................. 375/240.25; 382/275
(58) Field of Classification Search .............. 375/240.25
See application file for complete search history.

(56) References Cited

U.S. PATENT DOCUMENTS

| | | |
|---|---|---|
| 5,150,428 A | 9/1992 | Leone et al. |
| 6,829,302 B2 * | 12/2004 | Morishita et al. ........ 375/240.22 |
| 7,038,814 B2 | 5/2006 | Huovinen |
| 7,593,465 B2 * | 9/2009 | Jia et al. .................... 375/240.25 |
| 7,680,356 B2 * | 3/2010 | Boyce et al. .................. 382/275 |
| 7,957,469 B2 * | 6/2011 | Boyce et al. ............. 375/240.25 |
| 2006/0256871 A1 | 11/2006 | Boyce et al. |
| 2007/0047658 A1 | 3/2007 | Tourapis et al. |
| 2007/0058866 A1 | 3/2007 | Boyce et al. |
| 2007/0147505 A1 | 6/2007 | Bock |
| 2008/0152254 A1 * | 6/2008 | Kusakabe et al. ............. 382/275 |
| 2008/0165851 A1 * | 7/2008 | Shi .......................... 375/240.18 |

* cited by examiner

*Primary Examiner* — Jay Patel
*Assistant Examiner* — Jessica Prince
(74) *Attorney, Agent, or Firm* — Kenyon & Kenyon LLP

(57) ABSTRACT

A technique is provided for processing decoded video data to mask visual compression artifacts resulting from video compression. In accordance with this technique, a hardware block is provided for generating and adding random noise to the decoded video stream. In one embodiment, a random number is generated for each pixel of the decoded video data and compared against one or more threshold values to determine a threshold range. In such an embodiment, a noise addend value is selected based upon the threshold comparison and summed with the current pixel. While the present technique may not eliminate the compression artifacts, the addition of random noise renders the compression artifacts less noticeable to the human eye and, therefore, more aesthetically pleasing to a viewer.

24 Claims, 7 Drawing Sheets

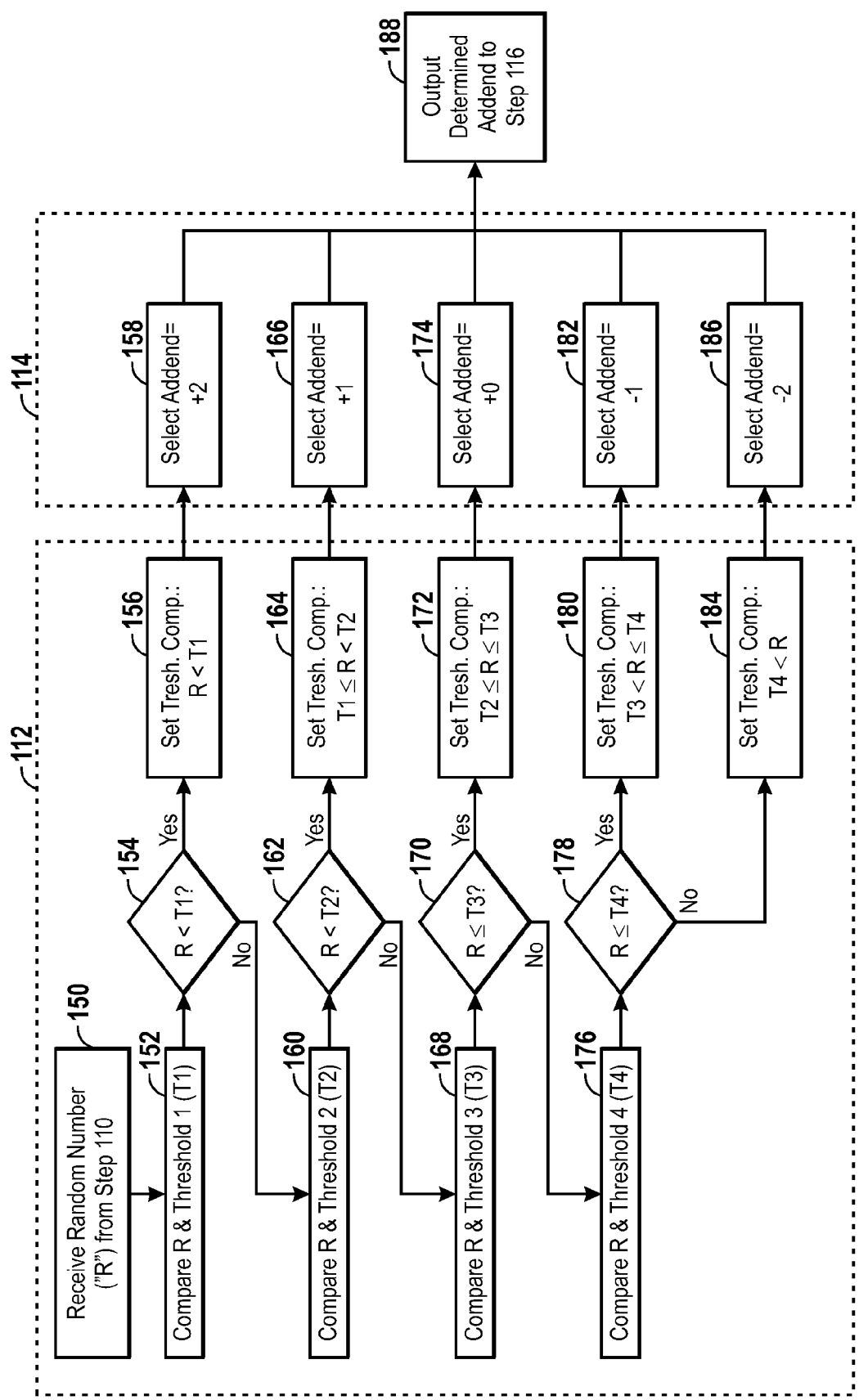

SYSTEM AND METHOD FOR MASKING VISUAL COMPRESSION ARTIFACTS IN DECODED VIDEO STREAMS

BACKGROUND

1. Technical Field

Embodiments of the present invention relate generally to techniques for processing decoded video data and, more particularly, to techniques for generating and adding random noise to mask visual compression artifacts in decoded video data.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As the popularity of mobile and portable electronic devices continues to grow, the demand for network-based digital multimedia has also increased. For example, many portable electronic devices, such as cellular phones and portable media players, are now capable of wirelessly connecting to and communicating through the Internet or through other networks, such as local or wide area networks, allowing a user to download or stream multimedia. However, transfer rates for downloading or streaming media are typically limited by the maximum bandwidth of a particular network, and may be further limited by any other additional network traffic simultaneously occurring on the particular network (e.g., concurrent downloads and transfers by other users).

To provide an example, it is not uncommon for video data having a window size of 320×240 pixels and a frame rate of 15 frames per second (fps) to be encoded at a bit rate of 300 kilobits/second (kb/s). At this bit rate, approximately 128.7 megabytes (MB) is required to represent one hour of video data. Thus, to stream the 128.7 MB of video data in real time, a network must support a consistent bandwidth of at least 300 kb/s, which may be well above the capabilities of some wireless or local networks. Alternatively, if a user decides to download and store a copy of the video data locally on a device, or to temporarily store the video data in memory (e.g., caching or buffering) for playback, the transfer rate for the download is still limited by the maximum network bandwidth. As such, the user may have to wait an excessive length of time for a download to complete before being able to view the video data. Moreover, mobile and portable electronic devices may be limited by the amount of storage space or memory available. Accordingly, downloading and/or storing local copies of very large video files may be impractical for some mobile or portable electronic devices.

One method for overcoming the aforementioned drawbacks of streaming media is through video compression, which refers generally to techniques for reducing the quantity of video data used to represent video images, while retaining as much of the original video image quality as possible. By compressing video data prior to transmission across a network and subsequently decoding the compressed video data on the receiving mobile or portable device, the total amount of video data transferred is reduced, thereby reducing the bit rate and the bandwidth required to transmit the digital video. For example, one such video compression standard, H.264 (also known as MPEG-4 Part 10) provides a high video compression algorithm capable of maintaining a high quality image while compressing video data by a factor of more than 30 times.

Disadvantageously, most video compression standards use lossy data compression techniques in which data determined by a particular compression algorithm to be of lesser importance to the overall content, but which is nonetheless discernible and objectionable to the user, is discarded. As a result, certain video compression algorithms may introduce visual artifacts into the decoded video stream, which may be distracting to a user when viewing the decoded video data. Such visual artifacts are generally attributable to the latent error in lossy data compression and may appear more frequently as higher video compression rates are used. Moreover, such artifacts are exacerbated when the decoded video images are scaled to larger high definition displays.

One solution for reducing the impact of visual artifacts is by introducing random noise into the video stream after the compressed video is decoded. This technique is often referred to as "random dithering." Although the added noise does not eliminate the visual artifacts, it may reduce the ability of the user to perceive the artifacts, thus rendering them less distracting to the human eye.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for introducing random noise into a decoded video stream to reduce or mask the visibility of compression artifacts. In accordance with one embodiment of the invention, an exemplary technique may provide a noise generation system for determining a random noise addend value and combining the noise addend value with received video data. To determine the noise addend value, a random number may be generated and compared with one or more threshold values defining a plurality of non-overlapping noise distribution threshold ranges which may be selected based on a noise distribution function. Comparison logic may be further provided to determine a threshold comparison result corresponding to the threshold range in which the random number belongs. Based on the threshold comparison result, a corresponding noise addend value may be selected from a noise addend value range, and subsequently combined with compressed video data (e.g., a pixel), essentially providing a DC offset with respect to the original value of the video data, thus introducing random noise to the video data.

In accordance with another aspect of the present invention, the noise generation system may include a storage device storing a plurality of noise distribution functions, such that the threshold values and noise distribution threshold ranges may be adaptively adjusted for each frame of video data, for example, by selecting a different noise distribution function for each video image frame. The selection of the noise distribution function may be based on one or more characteristics or properties of the received video data. In accordance with a further aspect of the present invention, the noise addend value range may be configurable to select noise added values from a first range or from a second range which is lesser than the first range. The abilities to adaptively adjust the threshold values and threshold ranges, as well as to provide multiple ranges from which the noise addend values may be selected provide increased flexibility in the distribution of the random noise, thus optimizing the overall masking of visual compression artifacts in the video data.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein:

FIG. 8 is a flowchart illustrating, in additional detail, the steps of comparing a random number against a plurality of thresholds and determining a noise addend based on a threshold comparison, as illustrated in FIG. 7, in accordance with one embodiment of the present invention.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
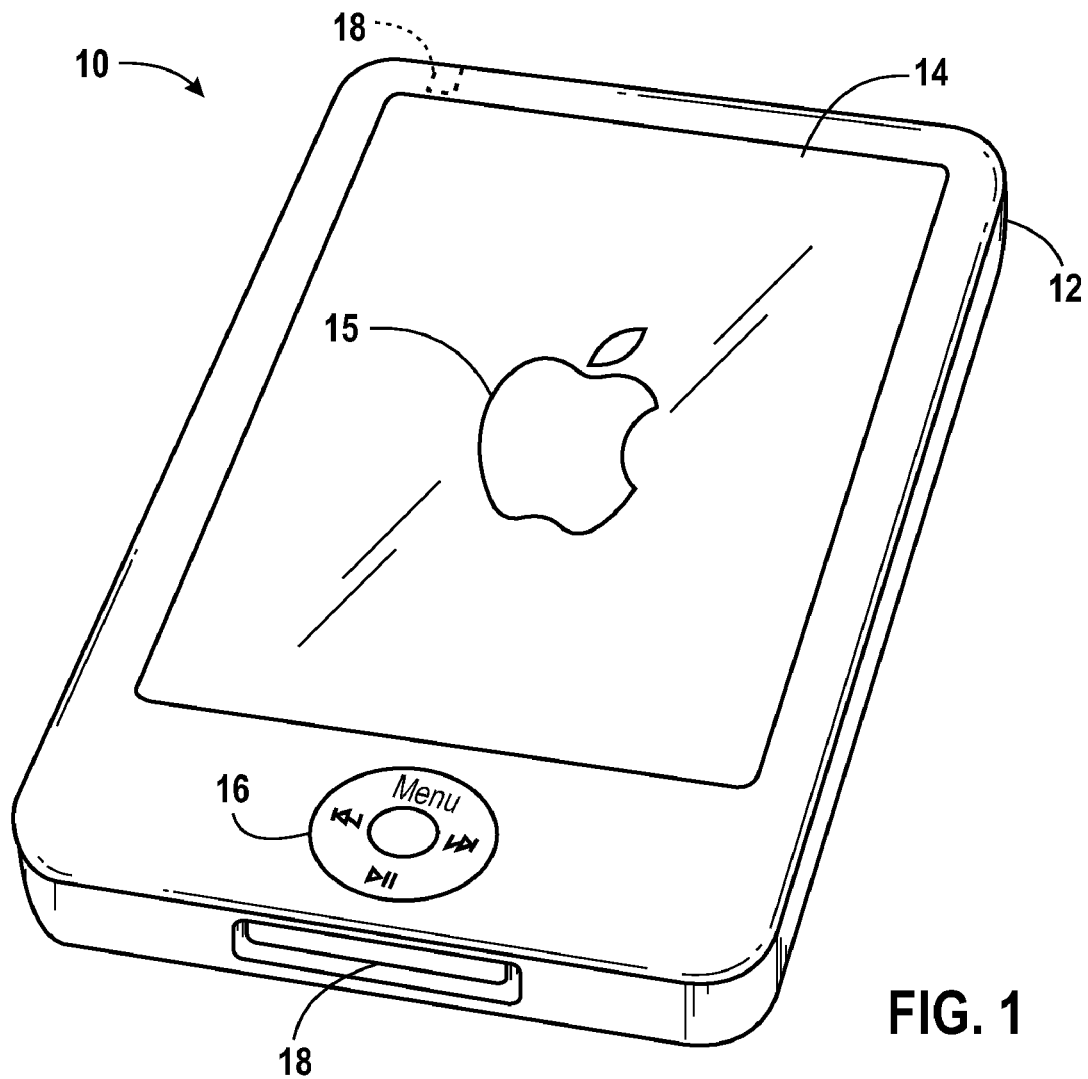
FIG. 1 is a perspective view illustrating an electronic device in accordance with one embodiment of the present invention.

An exemplary electronic device 10 is illustrated in FIG. 1 in accordance with one embodiment of the present invention. In some embodiments, including the presently illustrated embodiment, the device 10 may be a portable electronic device, such as a portable media player, capable of playing and displaying video image data. It should be noted, however, that the device 10 need not be specifically designed for displaying or playing video image data, and that in other embodiments, the device 10 may be provided by a cellular phone, a personal data organizer, or the like, having video display functionality incorporated therein. Thus, the electronic device 10 may be a unified device providing any one of or a combination of the functionality of the aforementioned devices.

In one or more embodiments, the device 10 may allow a user to connect to and communicate through the Internet or through other networks, such as local or wide area networks, for streaming video image data. The device 10, in other embodiments, may also allow users to download and store video data locally for later playback on the device 10. By way of example, the electronic device 10 may be a model of an iPod having a display screen or an iPhone available from Apple Inc.

In certain embodiments, the device 10 may be powered by one or more rechargeable and/or replaceable batteries. Such embodiments may be highly portable, allowing a user to carry the electronic device 10 while traveling, working, exercising, and so forth. In this manner, and depending on the functionalities provided by the electronic device 10, a user may play and view videos, listen to music, play games, record video or take pictures, place and receive telephone calls, communicate with other users via a network, control other devices (e.g., via remote control and/or Bluetooth functionality), and so forth while moving freely with the device 10. In addition, device 10 may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer, a television set, or a non-portable media player, such as Tivo, available from Tivo Inc., or Apple TV, available from Apple Inc.

In the presently illustrated embodiment, the exemplary device 10 includes an enclosure or housing 12, a display 14, user input structures 16, and input/output connectors 18. The enclosure 12 may be formed from plastic, metal, composite materials, or other suitable materials, or any combination thereof. The enclosure 12 may protect the interior components of the electronic device 10 from physical damage, and may also shield the interior components from electromagnetic interference (EMI).

The display 14 may be a liquid crystal display (LCD), a light emitting diode (LED) based display, an organic light emitting diode (OLED) based display, or any other suitable display. In accordance with certain embodiments of the present invention, the display 14 may display a user interface and various other images, such as logos, avatars, photos, album art, and the like, as depicted by reference numeral 15. Additionally, in one embodiment, the display 14 may include a touch screen through which a user may interact with the user interface. The display may also include various function and/or system indicators to provide feedback to a user, such as power status, call status, memory status, or the like. These indicators may be incorporated into the user interface displayed on the display 14.

As will be understood by those skilled in the art, many display systems are, for various reasons, not capable of displaying or sensing the different color channels at the same site. Therefore, in some embodiments, the display 14 of the device 10 may also include a pixel grid divided into single-color regions such as red, blue, and green, such that a "pixel" is made up of 3 sub-pixel components. The sub-pixel components contribute to the displayed or sensed color when viewed at a distance. However, for the purposes of this disclosure, the term "pixel" or the like should be interpreted as meaning either pixel or sub-pixel components of a video image. By way of example, a device providing 8 data bits (256 colors) each for red, blue, and green pixel components may produce a total of 16,777,216 ($256^3$) color combinations.

In one embodiment, one or more of the user input structures 16 are configured to control the device 10, such as by controlling a mode of operation, an output level, an output type, etc. For instance, the user input structures 16 may include a button to turn the device 10 on or off. Further the user input structures 16 may allow a user to interact with the user interface on the display 14. Embodiments of the portable electronic device 10 may include any number of user input structures 16, including buttons, switches, a control pad, a scroll wheel, or any other suitable input structures. The user input structures 16 may work with the user interface displayed on the device 10 to control functions of the device 10 and/or any interfaces or devices connected to or used by the device 10. For example, the user input structures 16 may allow a user to navigate a displayed user interface or to return such a displayed user interface to a default or home screen.

The exemplary device 10 may also include various input and output ports 18 to allow connection of additional devices. For example, a port 18 may be a headphone jack that provides for the connection of headphones. Additionally, a port 18 may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device 10 may use the input and output ports to connect to and send or receive data with any other device, such as other portable electronic devices, personal computers, printers, or the like. For example, in one embodiment, the device 10 may connect to a personal computer via an IEEE-1394 connection to send and receive data files, such as media files.

Figure 2:
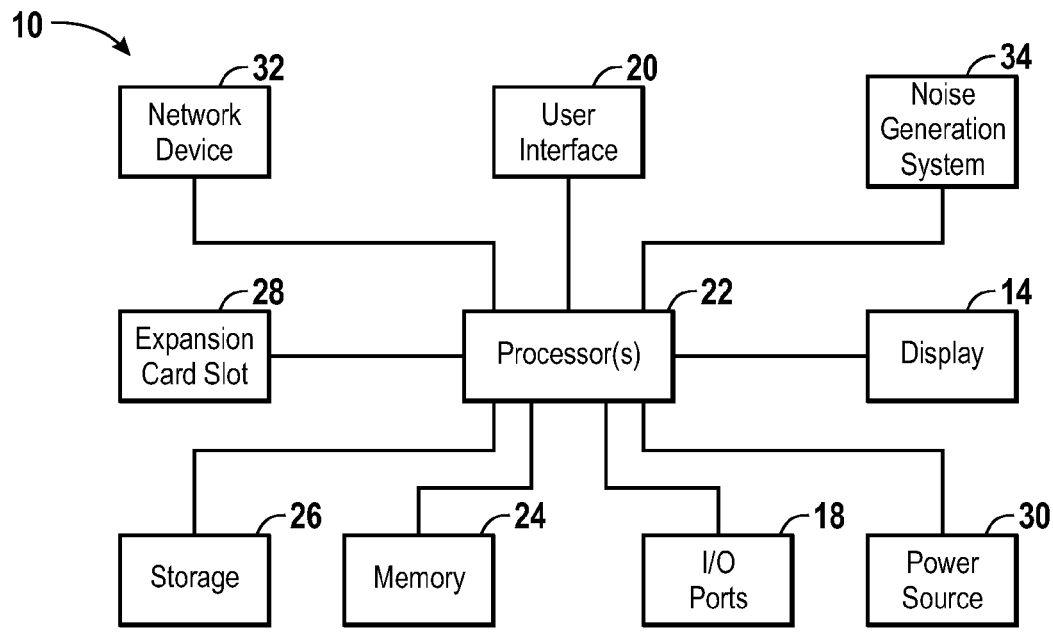
FIG. 2 is a simplified block diagram of the electronic device of FIG. 1 in accordance with one embodiment of the present invention.

Turning now to FIG. 2, a block diagram of components of an illustrative electronic device 10 is shown in accordance with an embodiment of the present invention. The block diagram includes the display 14 and I/O ports 18, discussed above. In addition, the block diagram of FIG. 2 illustrates a user interface 20, one or more processors 22, a memory device 24, a non-volatile storage 26, an expansion card slot 28, a power source 30, a networking device 32, and a noise generation system 34.

As discussed herein, the user interface 20 may be displayed on the display 14, and may provide a means for a user to interact with the electronic device 10. The user interface may be a textual user interface, a graphical user interface (GUI), or any combination thereof, and may include various layers, windows, screens, templates, elements, or other components that may be displayed in all or in part of the display 14. The user interface 20 may, in certain embodiments, allow a user to interface with displayed interface elements via one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 20.

The processor(s) 22 may provide the processing capability required to execute the operating system, programs, user interface 20, and any other functions of the device 10. The processor(s) 22 may include one or more microprocessors, such as one or more "general-purpose" microprocessors, one or more special-purpose microprocessors and/or ASICs, or some combination thereof. For example, the processor 22 may include one or more reduced instruction set (RISC) processors, as well as graphics processors, video decoders, video processors, and/or related chip sets.

As noted above, embodiments of the electronic device 10 may also include a memory 24. The memory 24 may include a volatile memory, such as random access memory (RAM), and/or a non-volatile memory, such as read-only memory (ROM). The memory 24 may store a variety of information and may be used for various purposes. For example, the memory 24 may store the firmware for the device 10, such as an operating system, other programs that enable various functions of the device 10 including user interface functions and processor functions. Moreover, the memory 24 may be used for buffering or caching data, such as video image data, during operation of the device 10.

The non-volatile storage 26 of device 10 of the presently illustrated embodiment may include ROM, flash memory, a hard drive, or any other suitable optical, magnetic, or solid-state storage medium, or a combination thereof. The storage 26 may store data files such as media (e.g., music and video files), software (e.g., for implementing functions on device 10), preference information (e.g., media playback preferences), wireless connection information (e.g., information that may enable the device 10 to establish a wireless connection, such as a telephone connection), subscription information (e.g., information that maintains a record of podcasts, television shows, or other media to which a user subscribes), telephone information (e.g., telephone numbers), and any other suitable data.

The embodiment illustrated in FIG. 2 also includes one or more expansion card slots 28. The card slots 28 may be configured to receive expansion cards that may be used to add functionality to the device 10, such as additional memory, I/O functionality, or networking capability. An expansion card may connect to the device through any type of suitable connector, and may be accessed internally or external to the enclosure 12. For example, in one embodiment, the card may be flash memory card, such as a SecureDigital (SD) card, mini- or microSD, CompactFlash card, Multimedia card (MMC), or the like. Additionally, in an embodiment including mobile telephone functionality, a card slot 28 may receive a Subscriber Identity Module (SIM) card.

The device 10 may also include a power source 30. In one embodiment, the power source 30 may be one or more batteries, such as a Li-Ion battery, may be user-removable or secured to the housing 12, and may or may not be rechargeable. Additionally, the power source 30 may include AC power, such as provided by an electrical outlet, and the device 10 may be connected to the power source 30 via the I/O ports 18.

The device 10 may further include a network device 32, such as a network controller or a network interface card (NIC). In one embodiment, the network device 32 may be a wireless NIC providing wireless connectivity over any 802.11 standard or any other suitable wireless networking standard. The network device 32 may allow the device 10 to communicate over a network, such as a LAN, WAN, MAN, or the Internet. Further, the device 10 may connect to and send or receive data with any device on the network, such as other portable electronic devices, personal computers, printers, and so forth. By way of example, in one embodiment, the device 10, via network device 32, may connect to the internet or to a personal computer on the same network to receive streaming video data. Alternatively, in some embodiments, the portable electronic device may not include a network device 32. In such an embodiment, a NIC may be interfaced with the device 10 via the card slot 28 to provide similar networking capability as described above.

The exemplary device 10 depicted in FIG. 2 may also include a noise generation system 34. As discussed above, due to the bandwidth limitations of some networks, it may be desirable, prior to streaming the video data, to compress the video data using a video compression algorithm (e.g. H.264/AVC) and to decode the compressed video data upon being received by the device 10. While high video compression rates significantly reduce the bit rate and required bandwidth for streaming the video data, the lossy nature of most video compression techniques results in the introduction of visual artifacts into the decoded video stream. Such artifacts may be distracting and aesthetically unpleasing to a viewer. Accordingly, the noise generation system 34 of the device 10 may be configured to process the decoded video data for the addition of random noise, in accordance with one or more random dithering algorithms, prior to outputting the decoded video data to the display 14. Although the addition of the random noise may not necessarily eliminate the compression artifacts, it may function to reduce the ability of the user to perceive the artifacts, thus increasing the overall aesthetic appearance of the decoded video image.

Figure 3:
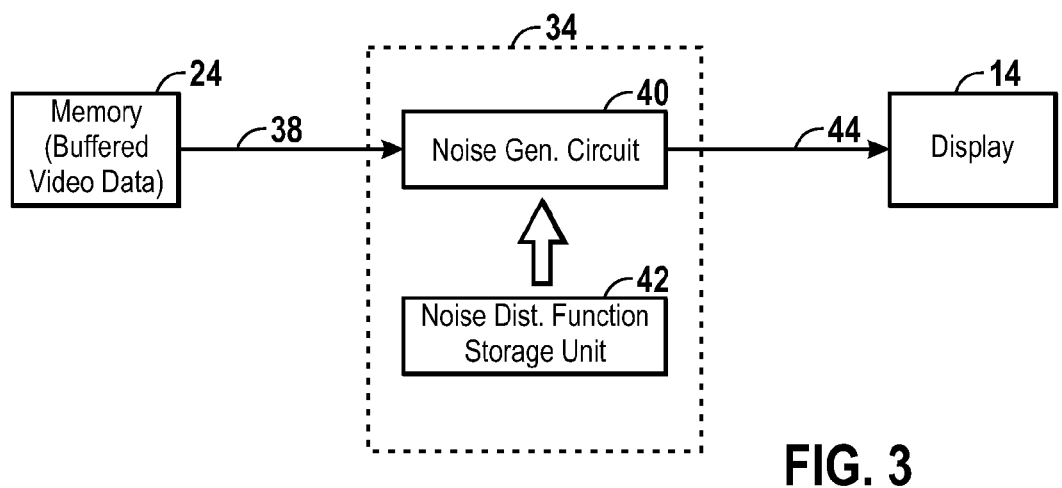
FIG. 3 is block diagram illustrating the processing of decoded video data for addition of random noise through use of a noise generation system in accordance with one embodiment of the present invention.

The operation of the noise generation system 34 may be better understood through reference to FIG. 3, which is a block diagram illustrating the processing of decoded video data by the noise generation system 34 for the addition of random noise. As discussed above, the device 10, upon receiving streaming compressed video data from a network connection via network device 30, may decode the compressed video data and temporarily buffer or cache the decoded video data in the memory 24. In one embodiment, the noise generation system 34 may sequentially process each frame of the video data buffered in the memory 24 on a pixel-by-pixel basis. Each buffered pixel is read from the memory 24 via an input data bus 38 coupled to the noise generation system 34. Further, in alternate embodiments, the noise generation system 34 may be adapted to operate directly on decoded video data without going through the memory 24.

In the illustrated embodiment, the noise generation system 34 may include a noise generation circuit 40 for processing each received pixel for addition of random noise by determining a noise addend value, which may be greater than zero, less than zero, or equal to zero (e.g., no noise added), and summing the determined noise addend value with the received pixel data. The processed pixel may then be subsequently outputted to the display 14 via an output data bus 44. The noise generation system 34 may repeat this operation for each pixel of the decoded video data buffered in the memory 24 until the entire stream of the decoded video data is processed. The procedure for determining the noise addend values will be discussed in further detail below. Further, although not explicitly illustrated in FIG. 3, the noise generation circuitry 40 may include its own processing unit and memory, and may receive power from the main power source 30 of the device 10. The noise generation circuit 40 will be further described below with regard to FIG. 5.

In the illustrated embodiment, the noise generation system 34 may be configured to select a noise distribution function for each frame of the buffered video data. The noise distribution function may be selected from a noise distribution function storage unit 42 containing a plurality of noise distribution functions. Each noise distribution function may define particular ranges and distribution of noise addend values based on one or more threshold values which may be applied to the processing of the buffered video data. In one embodiment, the noise generation system 34 may further include logic for selecting a noise distribution function based on one or more video characteristics of a particular frame, such as the degree or method of video compression, color range, or amount of spatial or motion detail, just to name a few, in order to provide an optimal distribution of random noise in a particular frame of the decoded video data for masking compression artifacts. The logic for selecting the noise distribution function may be implemented in either the noise generation circuit 40 or the noise distribution function storage 42. In the illustrated embodiment, the noise distribution function storage 42 may be provided by a non-volatile storage device, such as a ROM, flash memory, a hard drive, or any other suitable optical, magnetic, or solid-state storage medium, or a combination thereof. In one embodiment, the noise distribution function storage 42 may be implemented as a standalone non-volatile storage unit separate from the main non-volatile storage 26 of the device 10. In alternate embodiments, the noise distribution function storage 42 may be included as part of the main non-volatile storage 26.

While FIG. 3 illustrates an embodiment in which the noise generation system 34 includes a single noise generation circuit 40 for processing the decoded video data 38 on a pixel-by-pixel basis, it should be noted that other embodiments may include a plurality of noise generation circuits operative to process multiple pixels in parallel. For example, referring now to FIG. 4, an alternate embodiment of a noise generation system 34' having eight noise generation circuits 40a-40h is illustrated. In the illustrated embodiment, eight pixels of buffered decoded video data may be simultaneously read from the memory device 24 via an eight channel input data bus 38' to the noise generation system 34', wherein each of the eight channels of the input data bus 38' is coupled to a respective noise generation circuit 40a-40h. The eight pixels of decoded video data read from the memory 24 may be processed in parallel by the eight noise generation circuits 40a-40h for the addition of random noise in a manner similar to that of the noise generation circuit 40 described above with regard to FIG. 3. For example, for each of the eight pixels received, each respective noise generation circuit 40a-40h may determine a random noise addend value which is subsequently summed with each respective pixel. The resulting set of eight processed pixels may be outputted to the display 14 via an eight channel output data bus 44'.

The noise generation system 34' may repeat this operation, processing the decoded video data buffered in the memory 24 in subsequent groups of eight pixels until an entire stream of decoded video data is processed and outputted to the display 14. Further, as discussed above, each of the noise generation circuits 40a-40h may include its own processing unit and memory, and may receive power from the main power source 30 of the device 10. In other embodiments, the noise generation circuits 40a-40h may share a common memory and/or common processing unit.

In the illustrated embodiment, the noise generation system 34' may also include a noise distribution function storage unit 42 having a plurality of noise distribution functions store therein. For each frame of video data processed, the noise generation system 34' may include logic for selecting a noise distribution function from the noise distribution function storage unit 42 based on one or more video characteristics of the current video frame, such as the degree or method of video compression, color range, or amount of spatial or motion detail, in order to provide the optimal distribution of random noise in a particular frame of the decoded video data for masking compression artifacts. In the illustrated embodiment, the selected noise distribution function may be applied to all the noise generation circuits 40a-40h during the processing of the current video frame. As discussed above, the noise distribution function storage 42 may be implemented as a standalone non-volatile storage unit separate from the main non-volatile storage 26 of the device 10 or, in other embodiments, may be included as part of the main non-volatile storage 26.

In one particular embodiment, the noise generation circuits 40 or 40a-40h may be implemented as a hardware block which may be standalone and separate from a main video processing unit, such as a graphics processing unit (GPU). The hardware block may be capable of processing the video data independently of a GPU, thus allowing more flexible and complex dithering algorithms to be utilized without lags or interruptions in the streamed video. For example, as discussed above, the threshold values and the noise addend values may be dynamically set on a frame by frame basis in accordance with a noise distribution function which may be optimally selected based on one or more image characteristics of the current video frame. Further, because the processing of the video data by a hardware block effectively offloads this task from the GPU, power may be saved, thereby extending the overall battery life in portable and mobile devices, such as the device 10.

Figure 4:
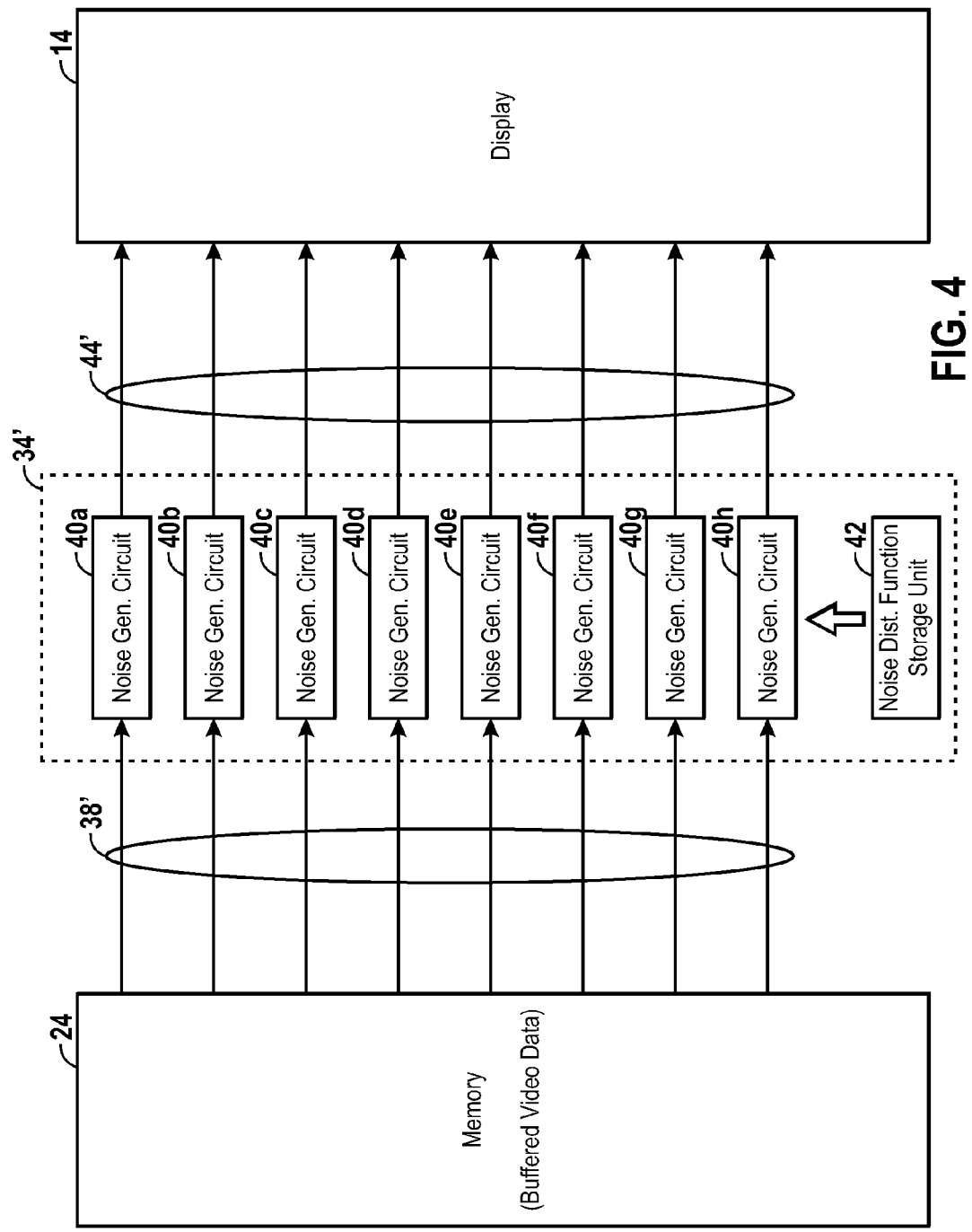
FIG. 4 is a block diagram illustrating the parallel processing of decoded video data for addition of random noise through use of a noise generation system in accordance with one embodiment of the present invention.
Figure 5:
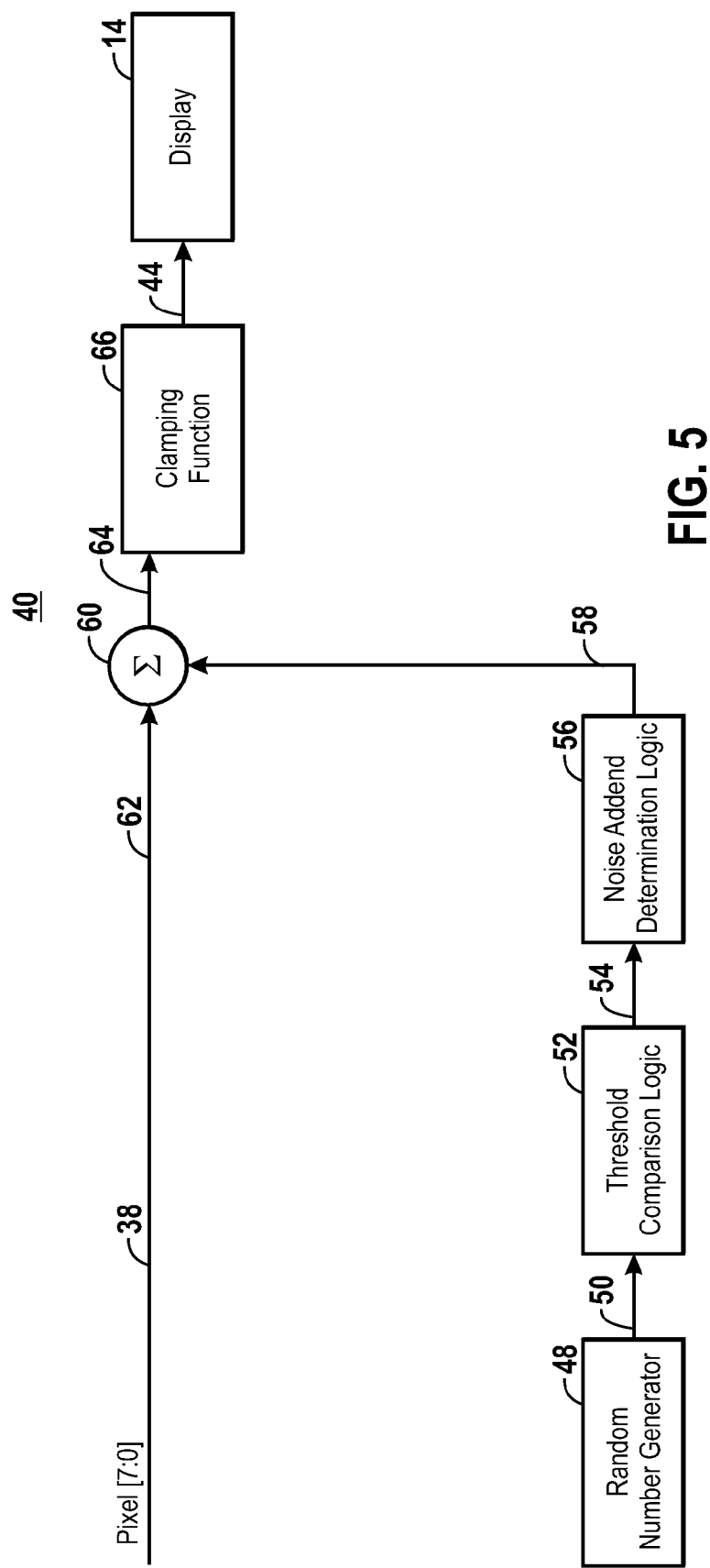
FIG. 5 is a block diagram illustrating a detailed view of the noise generation system of FIGS. 3 and 4 in accordance with one embodiment of the present invention.

The operation of the noise generation circuits 40 and 40a-40h described respectively in FIGS. 3 and 4 may be better understood with reference to FIG. 5, which illustrates a detailed block diagram of a noise generation circuit 40. The noise generation circuit of FIG. 5 includes a random number generator 48, a threshold comparison logic 52, a noise addend determination logic 56, summing circuitry 60, and clamping function 66.

The random number generator 48 is provided for generating a random number. The random number generator 48 may be implemented by any suitable hardware-based random or pseudo-random number generator or via a processing unit adapted for executing a random number generating algorithm. In one embodiment, the random number generator 48 may generate an 8-bit random number ([7:0]) having a range of values: 0-255. However, it should be noted that in alternate embodiments, the random number generator 48 may be implemented to generate a number within a smaller or larger numerical range of values depending on specific implementation and design goals of the device 10.

The generated random number is outputted by the random number generator 48, as depicted by reference numeral 50, and received by the threshold comparison logic 52. The threshold comparison logic 52 may select one of a plurality of non-overlapping threshold ranges defined by one or more threshold values. As will be discussed in further detail below, the one or more threshold values which define the non-overlapping threshold ranges may be set in accordance with a selected noise distribution function, which may be adaptively adjusted for each frame of the video data. In one embodiment, the threshold comparison logic 42 compares the random number 50 against the one or more threshold values stored in the threshold comparison logic 52 to determine a threshold range to which the random number 50 belongs. Based on the determined threshold range, a threshold comparison result 54 is outputted from the threshold comparison logic 52 and received by a noise addend determination logic block 56 which may select a noise addend value from a plurality of noise addend values based upon the received threshold comparison result 54.

Figure 6:
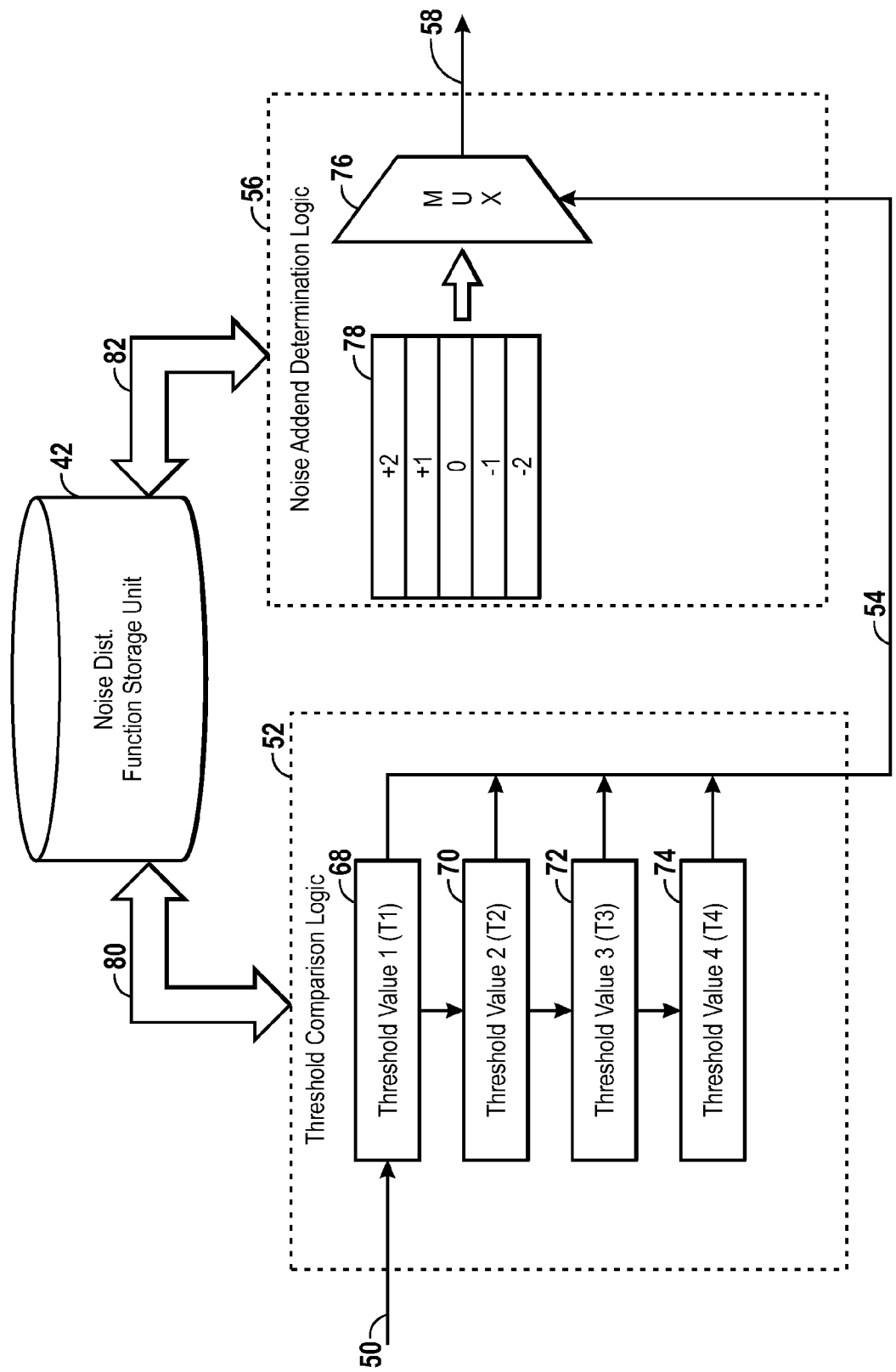
FIG. 6 is block diagram illustrating a more detailed view of the threshold comparison logic and noise addend determination logic of FIG. 5 in accordance with one embodiment of the present invention.

Referring now to FIG. 6, a detailed block diagram depicting one possible embodiment of the threshold comparison logic block 52 and the noise addend determination block 56 of FIG. 5 is illustrated. As depicted in FIG. 6, the threshold comparison logic 52 may include four threshold values, T1, T2, T3, and T4, respectively represented by structures 68, 70, 72, and 74. The structures 68, 70, 72, and 74 may include storage devices for storing the threshold values T1, T2, T3, and T4, such as data registers, memory cells or the like, as well as comparison circuitry for evaluating the random number 50 against the stored threshold values. By way of example, Table 1 illustrates one embodiment in which the threshold comparison logic 52 may evaluate a random number generated by the random number generator 48, designated by the variable "R," against the four threshold values T1, T2, T3, and T4, which may collectively define the following five non-overlapping threshold ranges:

TABLE 1

Possible Threshold Ranges Using Four Threshold Values (T1, T2, T3, T4)

| |
|---|
| $R < T1$ |
| $T1 \leq R < T2$ |
| $T2 \leq R \leq T3$ |
| $T3 < R \leq T4$ |
| $T4 < R$ |

Based on the value of R, one of the five threshold ranges defined in Table 1 may be selected and outputted as the threshold comparison result 54, which is received by the noise addend determination logic 56. As discussed above, the noise addend determination logic 56 may select a noise addend value from a range of noise addend values, based upon the threshold comparison result 54. In one embodiment, the noise determination logic 56 may select noise addend values from a noise addend value range of +2 to −2 (e.g., +2, +1, 0, −1, and −2) depending on the values of T1, T2, T3, and T4, such that each of the five threshold ranges illustrated in Table 1 corresponds to one of the noise addend values. The following table illustrates one possible implementation of this embodiment:

TABLE 2

| Threshold Comparison Result | Corresponding Noise Addend Value |
|---|---|
| $R < T1$ | +2 |
| $T1 \leq R < T2$ | +1 |
| $T2 \leq R \leq T3$ | 0 |
| $T3 < R \leq T4$ | −1 |
| $T4 < R$ | −2 |

As illustrated in Table 2, if the threshold comparison result 54 indicates R<T1, the noise addend determination logic 56 may select +2 as the noise addend value. If the threshold comparison result 54 indicates T1≦R<T2, the noise addend value of +1 may be selected. If the threshold comparison result 54 indicates T2≦R≦T3, the zero value noise addend (indicating no change in the pixel), may be selected. Additionally, if the threshold comparison result 54 indicates T3<R≦T4, a noise addend value of −1 may be selected and, similarly, a noise addend value of −2 may be selected if the threshold comparison result 54 indicates T4<R.

To provide one example, Table 3 below illustrates five threshold ranges and demonstrates the selection of a corresponding noise addend value when the threshold values T1, T2, T3, and T4 are set to 50, 100, 150, and 200, respectively.

TABLE 3

| Threshold Values | Possible Threshold Comparison Results | Corresponding Noise Addend Value |
| --- | --- | --- |
| T1 = 50 | 0-49 | +2 |
| T2 = 100 | 50-99 | −1 |
| T3 = 150 | 100-150 | 0 |
| T4 = 200 | 151-200 | −1 |
|  | 201-255 | −2 |

Based on the values set for T1, T2, T3, and T4, the five threshold ranges are defined as 0-49, 50-99, 100-150, 151-200, and 201-255. Therefore, if the threshold comparison result 54 indicates that the value of R is in the range 0-49, the noise addend determination logic 56 may select +2 as the noise addend value. If the threshold comparison result 54 indicates that the value of R is in the range 50-99, the noise addend value of +1 may be selected. Further, if the threshold comparison result 54 indicates that the value of R is in the range 100-150, the zero value noise addend (indicating no change in the pixel), may be selected. Additionally, if the threshold comparison result 54 indicates that the value of R is in the range 151-200, a noise addend value of −1 may be selected and, similarly, a noise addend value of −2 may be selected if the threshold comparison result 54 indicates that the value of R is in the range 201-255, where 255 is the maximum possible value for R, in accordance with the presently illustrated embodiment.

The noise addend determination logic 56 may be implemented using any suitable type of selection circuitry. In the illustrated embodiment, the noise addend determination logic 56 is provided by a 5-to-1 multiplexer circuit 76 configured to receive the threshold comparison result 54 as a control input. Based on the control input 54, a noise addend value may be selected from a range (e.g., +2, +1, 0, −1, −2) of possible noise addend values 78 and outputted from the multiplexer 76, as depicted by reference numeral 58.

Further, in the presently illustrated embodiment, in addition to being capable of providing a noise addend in a range of +2 to −2, the threshold comparison logic 52 and noise addend determination logic 56 may also be configurable to provide a noise addend value in a lesser range of +1 to −1, for example. For instance, when a smaller range is preferred, the threshold values may be set such that T1 and T4 are equal to the minimum and maximum values possible for R, respectively. Table 4 below illustrates an example in which the threshold values T1, T2, T3, and T4 are configured to provide the smaller range of noise addend values from +1 to −1:

TABLE 4

| Threshold Values | Possible Threshold Comparison Results | Corresponding Noise Addend Value |
| --- | --- | --- |
| T1 = 0 | R < 0 | (+2) |
| T2 = 120 | 0-119 | −1 |
| T3 = 180 | 120-180 | 0 |
| T4 = 255 | 181-255 | −1 |
|  | 255 < R | (−2) |

As discussed above, the value of the random number R may have a range of 0-255. Thus, as illustrated in Table 4, the threshold comparison result R<0 will never occur because the minimum value for R will never be less than 0. Similarly, the threshold comparison result 255<R will also never occur because the maximum value for R will never be greater than 255. Accordingly, the noise addend values +2 and −2 are never selected when the values of T1 and T4 are set to the minimum and maximum values for R, respectively. Therefore, the present configuration effectively yields only three possible threshold ranges, 0-119, 120-180, and 181-255, from which the noise addend values +1, 0, and −1 may be selected, respectively.

The flexibility to provide noise added values from either a range of +2 to −2 or a range of +1 to −1 allows for increased optimization in the masking of visual compression artifacts. As discussed above, the threshold values and noise addend values applied to the processing of video data may be based upon a particular noise distribution function, which, in some embodiments, may be selected from a plurality of noise distribution functions to optimize the amount of random noise added to each video frame. As illustrated in FIG. 6, the above discussed noise distribution function storage unit 42 is coupled to the threshold comparison logic 52 via data line 80 and the noise addend determination logic 56 via data line 82. Once an appropriate noise distribution function is selected, the values of T1, T2, T3, and T4 may be stored into the storage structures represented by reference numerals 68, 70, 72, and 74, respectively. Further, the noise distribution function may define the range from which the noise addend values may be selected (e.g., +2 to −2, +1 to −1).

The noise distribution function storage unit 42 may be implemented as a standalone non-volatile storage unit separate from the main non-volatile storage 26 of the device 10 or, in other embodiments, may be included as part of the main non-volatile storage 26. Because the noise distribution function storage unit 42 may store and provide access to a plurality of noise distribution functions, the threshold values defining the selectable threshold ranges and noise addend values may be adaptively adjusted (e.g., selecting an appropriate noise distribution function) for each frame of video data in order to optimize the masking of visual compression artifacts in the decoded video stream.

In certain embodiments, the selection of the noise distribution function may be based on one or more video image characteristics of the current image frame, such as the degree or method of video compression, color range, or amount of spatial or motion detail just to name a few. For example, when processing a 1 megabit/second heavily compressed video stream, it may be desirable to distribute the threshold values and/or noise addend values such that for each frame processed, approximately ⅓ of the pixels are positively offset (e.g., +1 or +2), approximately ⅓ of the pixels remain unchanged (e.g., 0), and the remaining ⅓ of the pixels are negatively offset (e.g., −1 or −2). For instance, if the random number generator 48 generates numbers in the range of 0-255, as discussed above, then ⅓ of the range, or approximately 85 of the possible 256 values, may be set to correspond to a noise addend value of either +1 or +2 (positive offset). Similarly, another ⅓ of the random number range may be set to correspond to a noise addend value of 0 (no change), and the remaining ⅓ of the random number range may be set to correspond to a noise addend value of either −1 or −2 (negative offset).

Further, within the ranges corresponding to the positive and negative offsets, approximately ⅓ of the values in each range may correspond to a noise addend value of +1 or −1, respectively, whereas the remaining ⅔ of the values within each range may correspond to a noise addend value of +2 or −2, respectively. Table 5 below illustrates one embodiment wherein the distribution of the threshold and noise addend values which reflects the particular noise distribution described above:

TABLE 5

| Threshold Ranges | Corresponding Noise Addend |
|---|---|
| 0-27 | +2 |
| 28-85 | +1 |
| 86-169 | 0 |
| 170-227 | −1 |
| 228-255 | −2 |

The various threshold values and noise addend characteristics described above are meant merely to provide illustrative examples of what may be one possible implementation of the present invention. It should be noted that other embodiments of the present invention need not be limited to the present examples and may utilize additional or fewer thresholds, different threshold values, and a different range of noise addend values depending on specific design goals or constraints. For example, if the video data being processed has a low compression rate, it may be desirable to set the threshold values and noise distribution such that fewer pixels are changed by the noise generation system 34.

Referring again to FIG. 5, a pixel 62 received from the decoded video data may be read from the memory 24 via the input data bus 38. In the illustrated embodiment, the received pixel 62 may include 8 bits of data to provide for 256 different color values (0-255). As discussed above, some embodiments of the display 14 may include single color regions represented by sub-pixels (e.g., red, green, and blue) which may contribute to the displayed or sense color when viewed at a distance. By way of example, an 8 bit red component, an 8 bit blue component, and an 8 bit green component, each color component having a range of 256 colors, may yield a combination of over 16 million different colors. Moreover, the number of bits used to represent each pixel of the video data need not be limited to the embodiment discussed herein and, indeed, other embodiments may be implemented with more or less bits of data per pixel depending on the specific application and design goals for a particular implementation.

The received pixel data 62 may be processed by summing the received pixel data 62 with the selected noise addend 58 (e.g. the output from the multiplexer circuit 76 of FIG. 6) via summing circuitry 60, producing processed pixel 64. While the received pixel data 62 in the presently illustrated embodiment may represent a color value in a range of 0 to 255, the addition (or subtraction) of the selected noise addend 58 when the pixel data 62 is near a maximum or minimum limit of the color range may cause pixel overrun, or a drastic shift in color, which is generally undesirable.

The illustrated embodiment provides a clamping function 66 to remedy this problem. The clamping function 66 may be configured to compare the processed pixel data 64 with an upper limit value that is less than the maximum of the color range and with a lower limit value that is greater than the minimum of the color range. For example, referring to the above discussed embodiment, an upper limit value may be less than 255 and a lower limit value may be greater than 0. If the processed pixel data 64 falls within the range defined by the upper and lower limit values, the processed pixel data 64 is outputted to the display 14, as indicated by the output data bus 44. However, if the processed pixel data exceeds the upper limit or falls below the lower limit, the clamping function 66 may normalize the processed pixel data 64 to fall within the range defined by the upper and lower limit to reduce the probability of pixel overrun. In one embodiment, the clamping function 66 may normalize the processed pixel 64 by clipping the value of the processed pixel 64 to be equivalent to the value of the upper or lower limits. By way of example, the presently illustrated clamping function 66 may include an upper limit value of 245 and a lower limit value of 10, such that any processed pixel data 64 having a value higher than the upper limit value is normalized to a value of 245, and such that any processed pixel data 64 having a value lower than the lower limit value is normalized to a value of 10. By clipping or normalizing each processed pixel data 64 in accordance with these limits, the occurrence of pixel overrun is significantly reduced, if not eliminated.

In alternate embodiments, the clamping function 66, rather than clipping the processed pixel data 64, may simply discard the processed pixel data 64 if it falls outside the range defined by the upper and the lower limits and output the original unmodified pixel data 62 to the display 14 instead. Additionally, other embodiments may provide for dynamically adjustable upper and lower limit values for each frame of video data which, like the threshold and noise addend values, may be determined by a noise distribution function selected from the noise distribution function storage unit 42 based upon one or more image characteristics of the current video frame for the optimal distribution of random noise to mask visual compression artifacts in the video stream.

Figure 7:
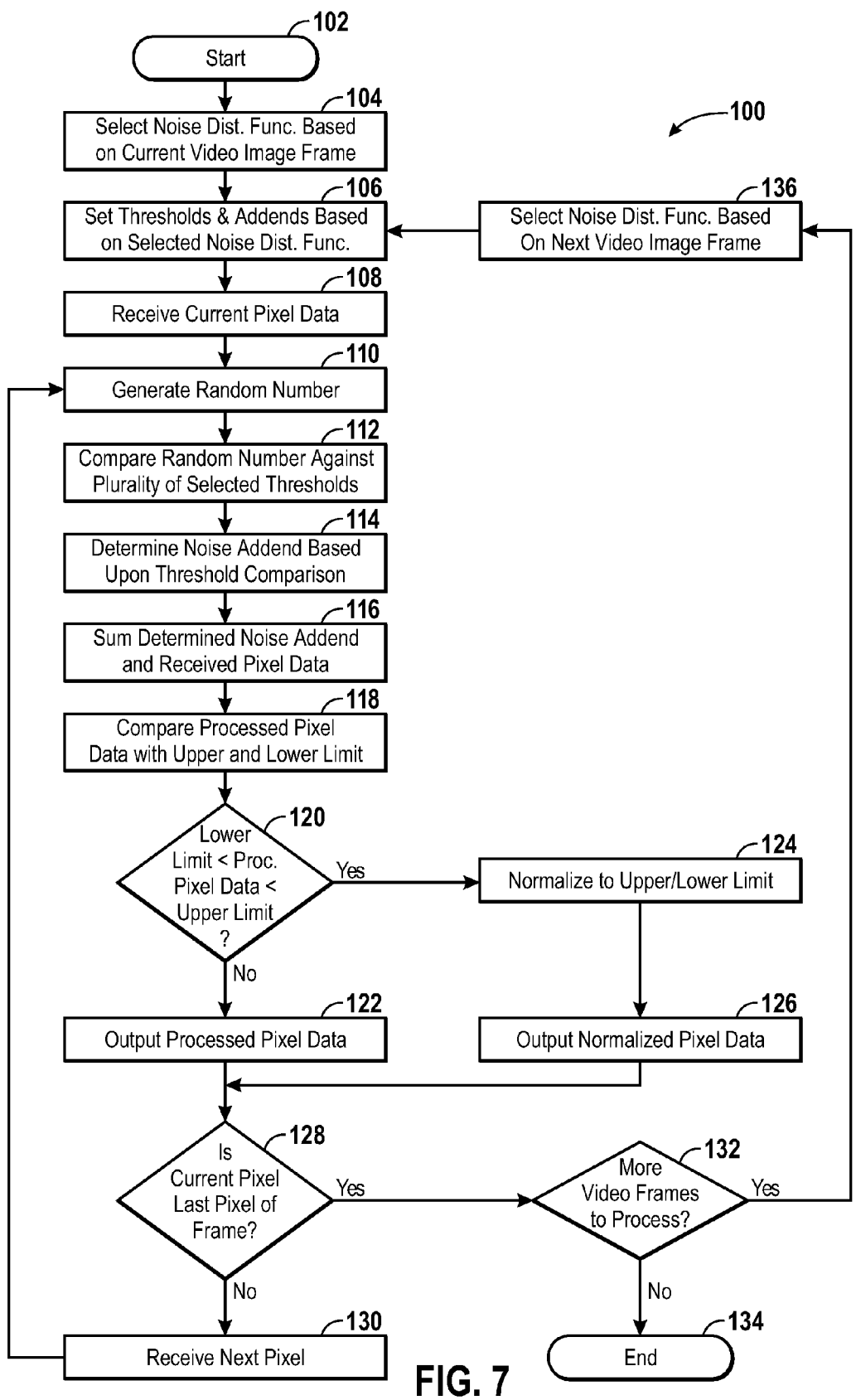
FIG. 7 is a flowchart depicting a process for adding random noise to a decoded video stream in accordance with one embodiment of the present invention.

Referring now to FIG. 7, an exemplary process for introducing random noise to decoded video data is illustrated, in accordance with the embodiment of the invention discussed above in FIGS. 5 and 6, and is designated generally by reference numeral 100. As discussed above, the decoded video data may be processed by a noise generation system 34 on a pixel-by-pixel basis, either serially or in parallel, for each frame of the video data. The method 100 begins processing the current video frame of the video data at step 102.

At step 104, a noise distribution function is selected for the current video frame. As discussed above, in some embodiments of the present invention, the noise distribution function may be selected from a plurality of stored noise distribution functions stored, for example, in the noise distribution function storage unit 42. Additionally, the noise distribution function may be selected to provide an optimal distribution of random noise in a particular frame of the decoded video data for masking compression artifacts, and may be based upon one or more image characteristics of the current frame, such as the degree or method of video compression, color range, or amount of spatial or motion detail. Based on the selected noise distribution function, one or more thresholds and corresponding noise addend values are determined, as illustrated at step 106. As discussed above, based on the threshold values, the noise addend value range may be configurable to provide noise addend values in a range of +2 to −2 or in a range of +1 to −1.

At step 108, a pixel of the decoded video data is received. In order to determine the amount of random noise to add to the received pixel data from step 108, a random number is generated, as illustrated by step 110, and compared to a plurality of threshold values at step 112. As discussed above, based on the comparison, it can be determined into what threshold range the random number from step 110 falls.

Further, based upon the threshold comparison of step 112, a corresponding noise addend value may be selected at step 114, and summed with the received pixel data (from step 108) at step 116. At step 118, the processed pixel data of step 116 is compared with an upper and lower limit value. For example, as discussed above, the upper limit value may be set lower than the maximum color value for the pixel data (e.g., 255 for an 8-bit pixel), and the lower limit value may be set higher than the minimum color value for the pixel data (e.g., 0). A determination is made, as illustrated at step 120, as to whether the processed pixel data falls within the range defined by the upper and lower limit values. If the processed pixel data is within the range, the processed pixel is outputted at step 122, for example, to the display 14. However, if the value of the processed pixel is greater than the upper limit value or less than the lower limit value, the processed pixel is normalized at step 124 to fall within the range defined by the upper and lower limit values. In one discussed embodiment, normalizing the pixel data may be accomplished by clipping the pixel to the upper limit value if the value of the processed pixel is greater than the upper limit value, or by clipping the processed pixel to the lower limit value if the value of the processed pixel is less than the lower limit value. The normalized pixel data may be outputted at step 126, for example, to the display 14. As discussed above, a normalization process, as illustrated by steps 120, 124 and 126, is desirable to prevent the occurrence of pixel overrun.

Following the output of the processed pixel data from step 122 or the normalized pixel data from step 126, a determination is made as to whether the outputted pixel is the last pixel of the current video frame, as indicated by step 128. If the current video frame still has remaining pixels to be processed, then the next pixel of the current video frame is received, as indicated by step 130, and the process for determining the random noise to add to the next pixel of the current video frame repeats starting from step 110. If, however, all pixels in the current video frame have been processed, a determination is made at step 132 as to whether there are additional video frames to be processed. If it is determined that there are no more video frames to process for addition of random noise, this generally indicates that the video data has completed processing, and has been displayed and played back (e.g., by display 14) in its entirety. As such, the process ends at step 134. However, if the video data has additional video frames remaining to be processed, the next video frame is received for processing. At step 136, a noise distribution function based on the next video frame is selected, and the process returns to step 106, wherein the threshold values and noise addend values are adjusted in accordance with the newly selected noise distribution function from step 136.

The steps described above with regard to comparing a random number to a plurality of thresholds and determining a noise addend value based on the threshold comparison may be better understood through reference to FIG. 8, which depicts a more detailed flowchart illustrating steps 112 and 114 of FIG. 7 in accordance with the embodiment of the invention discussed above in FIGS. 5 and 6.

As illustrated at block 150, the random number generated in step 110 of FIG. 7 and designated herein by the variable "R" is received. R is subsequently compared against a plurality of threshold values which, as discussed above, may be dynamically set for each frame of the video data. For example, as illustrated by step 152, R is first compared against a first threshold value T1. At decision step 154, if it is determined that R is less than T1, a threshold comparison result indicating a threshold range of R<T1 is set by step 156. Based on the threshold comparison result of step 156, a noise addend value of +2 is selected at step 158.

If at decision step 154, R is greater than T1, then R is compared against a second threshold value T2, as indicated at step 160. At decision step 162, if it is determined that R is less than T2, a threshold comparison result indicating a threshold range of T1≦R<T2 is set by step 164. Based on the threshold comparison result of step 164, a noise addend value of +1 is selected at step 166.

Moreover, at decision step 162, if R is greater than T2, then R is compared against a third threshold value T3, as indicated at step 168. At decision step 170, if it is determined that R is less than or equal to T3, a threshold comparison result indicating a threshold range of T2≦R≦T3 is set by step 172. Based on the threshold comparison result of step 172, a noise addend value of 0, indicating no change to the pixel data received at step 108 of FIG. 7, is selected at step 174.

Finally, if at decision step 170, R is greater than T3, then R is compared against a fourth threshold value T4, as indicated at step 176. At decision step 178, if it is determined that R is less than or equal T4, a threshold comparison result indicating a threshold range of T3<R≦T4 is set by step 180. Based on the threshold comparison result of step 180, a noise addend value of −1 is selected at step 182. However, if at decision step 178, R is determined to be greater than T4, then a threshold comparison result indicating a threshold range of T4<R is set by step 184 and, based on the threshold comparison result of step 184, a noise addend value of −2 is selected at step 186. The selected noise addend values from step 158, 166, 174, 182, or 186, are subsequently outputted, as indicated by step 188, and summed with the pixel data received at step 116 of FIG. 7.

While FIG. 8 describes the selection of the noise addend value from a range of +2 or −2, it should be kept in mind that the threshold comparison logic 52 and noise addend determination logic 56 may also be configurable to limit the noise addend range of +1 or −1, as discussed above. For instance, a noise addend range of +1 to −1 may be provided by setting the values of thresholds T1 and T4 to the minimum and maximum values for R, respectively, such that the conditions under which the noise addend determination logic 56 would normally select the +2 or −2 noise addend values (e.g., R<T1 when T1=0, T4<255 when T4=255) never occur.

Further, although the above discussed features of the noise generation circuit 40 have been described primarily with reference to hardware elements, it shall be appreciated by those skilled in the art that the functions carried out by the noise generation circuit 40 are not limited strictly to hardware components. Indeed, alternate embodiments of the foregoing techniques may also be implemented fully in software, such as a computer program including executable code stored on one or more tangible computer readable medium, or via a combination of both hardware or software elements.

Moreover, while the invention may be susceptible to various modifications and alternative forms, specific embodiments have been shown by way of example in the drawings and have been described in detail herein. Therefore, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for adding random noise to received video data comprising:
   a random number generator configured to generate a random number;
   comparison logic configured to compare the random number against each of one or more threshold values defining a plurality of numerical ranges, wherein the one or more threshold values are selected in accordance with a noise distribution function selected based at least partially upon one or more characteristics of a current image frame of the received video data, and wherein the noise distribution function further defined a range of noise addend values comprising a plurality of noise addend values each corresponding to a respective one of the plurality of numerical ranges;
   determination logic configured to determine which of the plurality of numerical ranges the random number belongs based upon the comparison;
   selection logic configured to select from a range of noise addend values, a noise addend value based on the determined numerical range; and
   summing logic configured to combine the selected noise addend value and the received video data to produce processed video data, wherein the processed video data appears to exhibit fewer visual compression artifacts relative to the received video data.

2. The system, as set forth in claim 1, wherein the noise distribution function is selected from a plurality of noise distribution functions stored in a memory.

3. The system, as set forth in claim 1, wherein the one or more characteristics for selecting the noise distribution function comprises at least one of a compression rate, a color, or a spatial characteristic of the current image frame.

4. The system, as set forth in claim 1, further comprising clamping logic configured to evaluate the value of the processed video data against an upper limit and a lower limit and to clamp the value of the processed video data if the value is greater than the range defined between the upper and lower limits.

5. The system, as set forth in claim 4, wherein clamping the processed video data comprises normalizing the value of the processed video data to equal the upper limit if the value of the processed video data exceeds the upper limit or to equal the lower limit if the value of the processed video data is less than the lower limit.

6. The system, as set forth in claim 4, wherein clamping the processed video comprises outputting the received video data instead of the processed video data.

7. The system, as set forth in claim 1, wherein the range of noise addend values is configurable to provide either a first range or a second range of noise addend values, the second range being greater than the first range.

8. A method for processing video data comprising:
   receiving the video data;
   generating a random number comprising a value within a range defined by a minimum value and a maximum value;
   selecting a noise distribution function in accordance with one or more characteristics of the received video data, wherein the noise distribution function comprises one or more threshold values defining a plurality of non-overlapping numerical ranges;
   comparing the random number against the one or more threshold values to determine a corresponding non-overlapping numerical range;
   selecting based upon the determined numerical range, a noise addend value from a range of noise addend values, wherein the range of the noise addend values is configurable to provide either a first range or a second range of noise addend values, the second range being greater than the first range; and
   processing the received video data by combining the noise addend value and the value of the received video data, such that the processed video data appears to exhibit fewer visual compression artifacts relative to the received video data.

9. The method, as set forth in claim 8, wherein the one or more threshold values comprise:
   a first threshold value;
   a second threshold value greater than the first threshold value;
   a third threshold value greater than the second threshold value; and
   a fourth threshold value greater than the third threshold value.

10. The method, as set forth in claim 9, wherein the plurality of numerical ranges comprises:
    a first numerical range comprising values less than the first threshold value;
    a second numerical range comprising values greater than or equal to the first threshold value and less than the second threshold value;
    a third numerical range comprising values greater than or equal to the second threshold value and less than or equal to the third threshold value;
    a fourth numerical range comprising values greater than the third threshold value and less than or equal to the fourth threshold value; and
    a fifth numerical range comprising values greater than the fourth threshold value.

11. The method, as set forth in claim 10, wherein each of the first, second, third, fourth, and fifth numerical ranges corresponds to unique respective noise addend values.

12. The method, as set forth in claim 11, comprising:
    selecting a first noise addend value if the determined numerical range is the first numerical range;
    selecting a second noise addend value if the determined numerical range is the second numerical range;
    selecting a third noise addend value if the determined numerical range is the third numerical range;
    selecting a fourth noise addend value if the determined numerical range is the fourth numerical range; and
    selecting a fifth noise addend value if the determined numerical range is the fifth numerical range.

13. The method, as set forth in claim 12, wherein the first range of noise addend values comprises a range of +1 to −1, and wherein the second range of noise addend values comprises a range of +2 to −2.

14. The method, as set forth in claim 13, wherein the first noise addend value is equal to +2, wherein the second noise addend value is equal to +1, wherein the third noise addend value is equal to 0, wherein the fourth noise addend value is equal to −1, and wherein the fifth noise addend value is equal to −2.

15. The method, as set forth in claim 13, wherein providing the first range of noise addend values in the range of +1 to −1 comprises selecting the one or more threshold values such that the determined numerical range is never the first numerical range or the fifth numerical range.

16. The method, as set forth in claim 15, comprising setting the first threshold value equal to the minimum value of the random number, and setting the fourth threshold value equal to the maximum value of the random number.

17. A method for processing a plurality of image frames representative of video data for the addition of random noise comprising:
   (a) providing a plurality of noise distribution functions, each of the plurality of noise distribution functions comprising one or more threshold values defining a plurality of numerical ranges, wherein each of the plurality of numerical ranges corresponds to a respective noise addend value defined by a range of noise addend values, and providing an input for comparison against each of the one or more threshold values defining the plurality of numerical ranges;
   (b) receiving an image frame of the video data;
   (c) selecting a noise distribution function based at least partially on one or more characteristics of the image frame;
   (d) processing the image frame for the addition of random noise by selecting noise addend values based upon the threshold values defined by the selected noise distribution function;
   (e) displaying the processed image frame; and
   (f) receiving a subsequent image frame and repeating steps (b) through (e) until each of the plurality of image frames representative of the video data is processed.

18. The method of claim 17, wherein the one or more characteristics for selecting the noise distribution function comprises at least one of a compression rate, a color, or a spatial characteristic of the current image frame.

19. The method of claim 17, wherein processing the image frame for the addition of random noise comprises:
   (i) receiving a pixel of the image frame;
   (ii) generating a random number as the input;
   (iii) comparing the random number against the one or more threshold values;
   (iv) based upon the comparison, determining from the plurality of numerical ranges, a numerical range corresponding to the random number;
   (v) selecting a corresponding noise addend value based upon the determined numerical range;
   (vi) summing the selected noise addend value and the value of the received pixel to produce a processed pixel;
   (vii) outputting the processed pixel; and
   (viii) if additional pixels remain in the image frame, receiving the next pixel of the image frame and repeating steps (ii) through (vii) until all pixels in the image frame are processed.

20. The method of claim 17, wherein the one or more threshold values are distributed such that approximately a first ⅓ of the pixels in the image frame are unchanged by summing a noise addend value of 0, approximately a second ⅓ of the pixels in the image frame are offset by summing a negative noise addend value, and approximately a third ⅓ of the pixels in the image frame are offset by summing a positive noise addend value.

21. The method of claim 17, wherein the range of noise addend values is configurable to provide either a first range of noise addend values or a second range of noise addend values, the second range being greater than the first range.

22. An electronic device comprising:
   a processor configured to execute instructions for the playback of video data;
   memory configured to store data, the data at least partially comprising the instructions to be executed by the processor;
   noise generation circuitry configured to process the video data, wherein processing the video data comprises, for each pixel of the video data, selecting a random noise addend value from one of a first range and a second range of noise addend values, and summing the selected noise addend value with the value of the respective pixel; and
   a display operable for displaying the processed video data.

23. The electronic device, as set forth in claim 22, wherein the electronic device is a portable media player.

24. The electronic device, as set forth in claim 22, wherein the noise generation circuitry is operable to process eight pixels in parallel.

* * * * *